United States Patent
Kim

(10) Patent No.: US 6,396,603 B1
(45) Date of Patent: May 28, 2002

(54) MONITORING THE STABILITY OF THE WAVELENGTH OF A LIGHT SIGNAL IN AN OPTICAL COMMUNICATIONS SYSTEM EMPLOYING WAVELENGTH DIVISION MULTIPLEXING AND HAVING A WAVELENGTH STABILIZATION CIRCUIT

(75) Inventor: Byung-Jik Kim, Songnam-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/365,250

(22) Filed: Jul. 30, 1999

(30) Foreign Application Priority Data

Jul. 30, 1998 (KR) .............................. 98/30893
Jun. 28, 1999 (KR) .............................. 99/24668

(51) Int. Cl.$^7$ .............................................. H04J 14/02
(52) U.S. Cl. ........................ 359/133; 359/187; 359/124
(58) Field of Search ............................... 359/133, 187, 359/124–134

(56) References Cited

U.S. PATENT DOCUMENTS

| | | | |
|---|---|---|---|
| 4,989,201 A | * 1/1991 | Glance ........................... | 370/3 |
| 5,080,505 A | 1/1992 | Epworth | |
| 5,387,992 A | * 2/1995 | Miyazaki et al. ............ | 359/124 |
| 5,428,700 A | 6/1995 | Hall | |
| 5,432,629 A | * 7/1995 | Shikada ....................... | 359/124 |
| 5,510,922 A | 4/1996 | Naito | |
| 5,589,970 A | * 12/1996 | Lyu et al. .................... | 359/133 |
| 5,617,234 A | 4/1997 | Koga et al. | |
| 5,745,270 A | 4/1998 | Koch | |
| 5,777,773 A | * 7/1998 | Epworth et al. ............. | 359/182 |
| 5,793,910 A | 8/1998 | Derr | |
| 5,796,479 A | 8/1998 | Derickson et al. | |
| 5,825,792 A | 10/1998 | Villeneuve et al. | |
| 5,915,052 A | 6/1999 | Ball | |

* cited by examiner

*Primary Examiner*—Leslie Pascal
*Assistant Examiner*—Hanh Phan
(74) *Attorney, Agent, or Firm*—Robert E. Bushnell, Esq.

(57) ABSTRACT

A circuit for monitoring the stability of light signals in an optical communications system employing WDM and having a wavelength stabilization circuit, includes: a plurality of channel transmitters each having a laser diode for generating a light signal at a particular frequency under the control of a laser diode driver; a WDM device for multiplexing the wavelengths by wavelength division; a Fabry-Perot filter having resonant frequencies continuously arranged with given free spectral ranges according to the central frequencies specified for the channels to resonate an output of the WDM device; a photodetector for converting the output light signals of the Fabry-Perot filter into corresponding electrical signals, and a quadrature phase shifter for shifting the phase of the lot output signal of the photodetector by 90°. Each of the channel transmitters further includes: an oscillator for generating a dither signal of a frequency specified for the particular channel; a first PSD for effecting a phase sensitive detection of the dither signal and the output signal of the photodetector to generate an error signal corresponding to the first derivative signal of an Airy function; a first LPF for filtering the error signal to generate a first direct current voltage of a level representing the deviation of the output signal of the photodetector from the specified central frequency; an adder for adding the dither signal and first detected voltage to generate a bias signal supplied to the laser diode driver; a second PSD for effecting a phase sensitive detection of the dither signal and the output of the quadrature phase shifter to generate an intensity signal representing the intensity of the light signal transmitted by the WDM device; a second LPF for filtering the intensity signal to generate a second direct current voltage, and the monitor circuit monitoring the first and second detected voltages so as to indicate whether or not the wavelength of the light signal is stabilized based on the first and second detected voltages.

12 Claims, 4 Drawing Sheets

FIG. 1 *(Related Art)*

MONITORING THE STABILITY OF THE WAVELENGTH OF A LIGHT SIGNAL IN AN OPTICAL COMMUNICATIONS SYSTEM EMPLOYING WAVELENGTH DIVISION MULTIPLEXING AND HAVING A WAVELENGTH STABILIZATION CIRCUIT

CLAIM OF PRIORITY

This application makes reference to, incorporates the same herein, and claims all benefits accruing under 35 U.S.C. §119 from two applications, WAVELENGTH STABILIZING CIRCUIT PROVIDED WITH A CIRCUIT FOR MONITORING THE STATE OF THE WAVELENGTH OF A LIGHT SIGNAL IN AN OPTICAL COMMUNICATIONS SYSTEM EMPLOYING WAVELENGTH DIVISION MULTIPLEXING filed with the Korean Industrial Property Office on Jul. 30, 1998 and there duly assigned Ser. No. 30893/1998, and WAVELENGTH STABILIZING CIRCUIT PROVIDED WITH A CIRCUIT FOR MONITORING THE STATE OF THE WAVELENGTH OF A LIGHT SIGNAL IN AN OPTICAL COMMUNICATIONS SYSTEM EMPLOYING WAVELENGTH DIVISION MULTIPLEXING filed with the Korean Industrial Property Office on Jun. 28, 1999 and there duly assigned Ser. No. 24668/1999.

BACKGROUND OF THE INVENTION

1. Field of the Invention

The present invention relates to an optical communications system employing wavelength division multiplexing (WDM), and more particularly a circuit for monitoring the stability of the wavelengths of the light signals generated by the channel transmitters.

2. Description of the Related Art

In an optical communications system, WDM is the sharing of a single optical fiber to transmit a plurality of light signals having different wavelengths. On the contrary, the light signals multiplexed on a single optical fiber are separated by a wavelength division demultiplexing method. The optical communications system employing WDM comprises a plurality of channel transmitters, each of which employing a laser diode having a narrow spectrum as the light source. The wavelengths of the channels must be arranged closely with a narrow interval on the order of 100 or 200 GHz between adjacent channels, so that the wavelength of the light signal generated by each laser diode may not exceed the range prescribed for the respective channel. Hence, it is necessary to monitor and control the wavelength of the light signal of each channel so as to be within the prescribed range.

One of the methods for stabilizing the wavelength of the light signal of each channel within the prescribed range is to employ an optical fiber Fabry-Perot filter, which stabilizes a plurality of channels as a whole so that adjacent channels completely separated. An example of this is disclosed in an article entitled "4-Channel Light Frequency Multiplexing" authored by Kap Yeol Ryu et al., *Journal of Korean Institute of Electronic Engineers*, Vol 32, Part A, Section No. 8, pp. 133–138, Article No. 95-32A-8-16.

A wavelength stabilizing circuit provided in an optical communication system employing WDM includes a Fabry-Perot filter as disclosed in the previously cited Ryu et al. article. Such a WDM communication system includes a plurality of transmitters each comprising a laser diode, a laser diode driver, an oscillator, a PSD (phase sensitive detector), an LPF (low pass filter) and an adder. The laser diode driver drives the laser diode to generate a light signal at a frequency prescribed for the particular channel. All of the channel transmitters generate respective light signals having different wavelengths.

All of the light signals generated by the channel transmitters are inputted into the WDM device which multiplexes the light signals. The multiplexed light signals are transmitted through an optical transmission path. The Fabry-Perot filter, photodetector, oscillator, PSD, LPF, and adder serve to stabilize the wavelengths. The frequency of the light signal varies in the range of a few KHz around the resonant frequency of the Fabry-Perot filter and is detected by the phase sensitive detector to stabilize the wavelength. The Fabry-Perot filter and photodetector are commonly used for all of the channels while the oscillator, PSD, LPF, and adder are provided for every channel transmitter.

The Fabry-Perot filter has resonant frequencies continuously arranged with given free spectral ranges according to the central frequencies specified for the channels. The Fabry-Perot filter is connected to the output of the WDM device. The light signal transmitted from the WDM device through a light transmission path is partially branched to the Fabry-Perot filter. The photodetector converts the light signals from the Fabry-Perot filter into respective electrical signals supplied to the PSD's of the channel transmitters. The oscillator of each channel transmitter generates a particular dither signal supplied to the PSD and adder. The dither signal is a sine wave used to modify the specified central frequency of each channel transmitter so as to vary the frequency of the light signal around the resonant frequency to obtain an error signal for stabilizing the wavelength. The PSD effects a phase sensitive detection of the dither signal and the output signal of the photodetector so as to obtain an error signal corresponding to the first derivative signal of an Airy function which represents the transmission characteristic curve of the Fabry-Perot filter. The LPF filters the error signal to generate a direct current voltage of a level that represents the deviation of the wavelength of the light signal from the specified central frequency. The detected voltage is supplied to the adder and combined with the dither signal from the oscillator to form a bias signal of the laser diode driver and accordingly, the wavelength of the light signal of the laser diode is stabilized within a desired range.

The detected voltage of the LPF may be divided into three parts according to the variation of the wavelength of the light signal of the laser diode. Firstly, if the wavelength precisely agrees with the specified central frequency, the detected voltage is 0V. Secondly, if it slightly deviates from the specified central frequency, the detected voltage has a level representing the deviation. However, thirdly, if it greatly deviates from the specified central frequency only to be out of the transmission characteristic curve of the Fabry-Perot filter, the detected value is 0V. Thus, the detected voltage is 0V not only when the wavelength of the light signal precisely agrees with the specified central frequency, but when it be out of the transmission characteristic curve of the Fabry-Perot filter greatly deviating from the stabilized range. Therefore, it is impossible to correctly determine the stabilization of the wavelength only with the error signal. Namely, if the wavelength of a channel greatly deviates from the stabilized range, it cannot be detected at the transmission side, but at the receiving side only after receiving the signal. This delays the correction of such an error.

The following patents each discloses features in common with the present invention but do not teach or suggest monitoring the stability of the wavelength of a light signal in an optical communication system employing wavelength division multiplexing and having a wavelength stabilizing circuit as in the present invention: U.S. Pat. No. 5,080,505 to Epworth, issued on Jan. 14, 1992, entitled OPTICAL TRANSMISSION SYSTEM; U.S. Pat. No. 5,745,270 to Koch, issued on Apr. 28, 1998, entitled METHOD AND APPARATUS FOR MONITORING AND CORRECTING INDIVIDUAL WAVELENGTH CHANNEL PARAMETERS IN A MULTI-CHANNEL WAVELENGTH DIVISION MULTIPLEXER SYSTEM, U.S. Pat. No. 5,428,700 to Hall, issued on Jun. 27, 1995, entitled LASER STABILIZATION; U.S. Pat. No. 5,510,922 to Naito, issued on Apr. 23, 1996, entitled OPTICAL FREQUENCY STABILIZER AND OPTICAL FREQUENCY SELECTOR; U.S. Pat. No. 5,915,052 TO Ball, issued on Jun. 22, 1999, entitled LOOP STATUS MONITOR FOR DETERMINING THE AMPLITUDE OF THE SIGNAL COMPONENTS OF A MULTI-WAVELENGTH OPTICAL BEAM, U.S. Pat. No. 5,825,792 to Villeneuve et al., issued on Oct. 20, 1998, entitled WAVELENGTH MONITORING AND CONTROL ASSEMBLY FOR WDM OPTICAL TRANSMISSION SYSTEMS; U.S. Pat. No. 5,796,479 to Derickson et al., ISSUED ON Aug. 18, 1998, entitled SIGNAL MONITORING APPARATUS FOR WAVELENGTH DIVISION MULTIPLEXED OPTICAL TELECOMMUNICATION NETWORKS; U.S. Pat. No. 5,617,234 to Koga et al., issued on Apr. 1, 1997, entitled MULTIWAVELENGTH SIMULTANEOUS MONITORING CIRCUIT EMPLOYING ARRAYED-WAVEGUIDE GRATING; and U.S. Pat. No. 5,793,910 to Derr, issued on Aug. 11, 1998, entitled METHOD AND CIRCUIT ARRANGEMENT FOR FREQUENCY STABILIZATION OF A WDM MULTIPLEXER/DEMULTIPLEXER.

SUMMARY OF THE INVENTION

It is an object of the present invention to provide a circuit for monitoring the stability of the wavelength of a light signal in an optical communications system having a wavelength stabilizing circuit.

According to an aspect of the present invention, a circuit for monitoring the stability of the wavelengths of light signals in an optical communications system employing WDM and having a wavelength stabilization circuit, comprises: a plurality of channel transmitters each having a laser diode for generating a light signal at a particular frequency under the control of a laser diode driver; a WDM device for multiplexing the wavelengths by wavelength division; a Fabry-Perot filter having resonant frequencies continuously arranged with given free spectral ranges according to the central frequencies specified for the channels to resonate an output of the WDM device; a photodetector for converting the output light signals of the Fabry-Perot filter into corresponding electrical signals; and a quadrature phase shifter for shifting the phase of the output signal of the photodetector by 90°. Each of the channel transmitters further comprises: an oscillator for generating a dither signal of a frequency specified for the particular channel; a first PSD for effecting a phase sensitive detection of the dither signal and the output signal of the photodetector to generate an error signal corresponding to the first derivative signal of an Airy function; a first LPF for filtering the error signal to generate a first detected direct current voltage having a level representing the deviation of the output signal of the photodetector from the specified central frequency; an adder for adding the dither signal and first detected voltage to generate a bias signal supplied to the laser diode driver; a second PSD for effecting a phase sensitive detection of the dither signal and the output of the quadrature phase shifter to generate an intensity signal representing the intensity of the light signal transmitted by the WDM device; a second LPF for filtering the intensity signal to generate a second detected direct current voltage, and the monitor circuit monitoring the first and second detected voltages so as to indicate whether or not the wavelength of the light signal is stabilized based on the first and second detected voltages.

The present invention will now be described more specifically with reference to the drawings attached only by of example.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
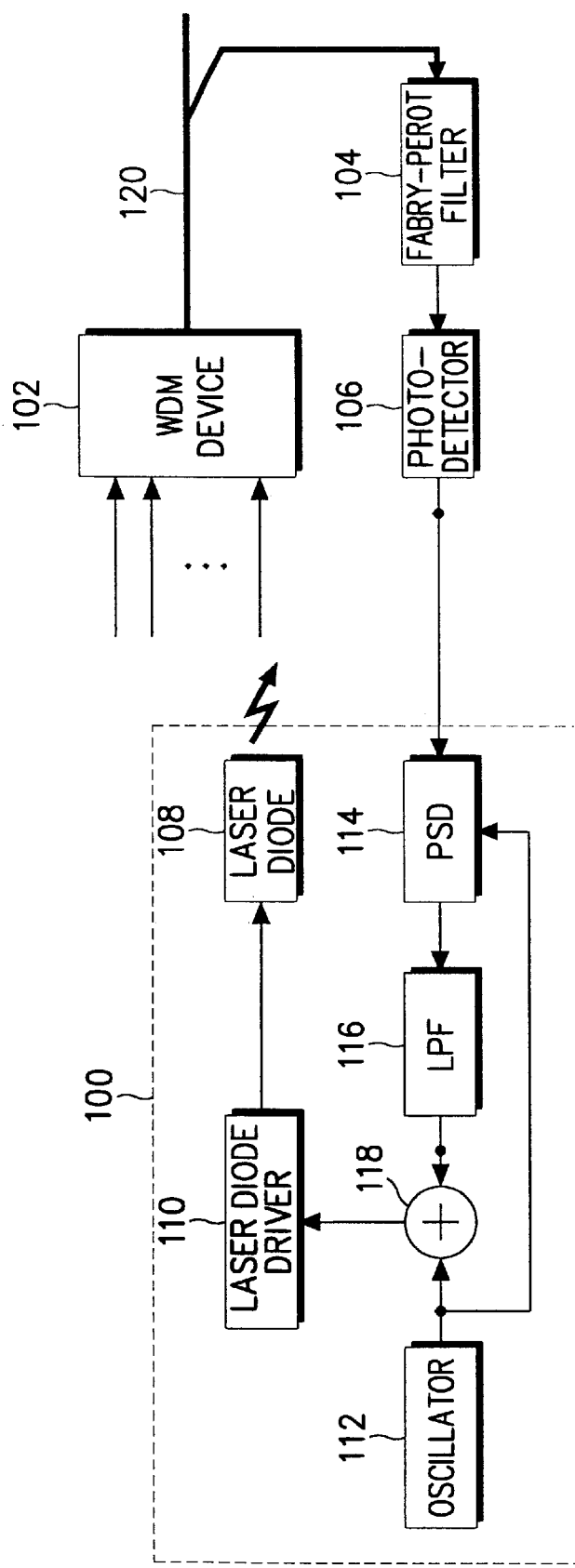
FIG. 1 is a block diagram illustrating a wavelength stabilizing circuit employing the Fabry-Perot filter in a WDM optical communications system.

FIG. 1 is a block diagram illustrating a wavelength stabilizing circuit provided in an optical communications system employing WDM, including the Fabry-Perot filter as disclosed in the previously cited Ryu et al. article. Although a single channel transmitter 100 is shown in the drawing, the WDM communications system includes a plurality of channel transmitters 100 for the light signals. Each channel transmitter 100 comprises a laser diode 108, a laser diode driver 110, an oscillator 112, a PSD (Phase Sensitive Detector) 114, an LPF (Low Pass Filter) 116, and an adder 118. The laser diode driver 110 drives the laser diode 108 to generate a light signal at a frequency prescribed for the particular channel In this case, the laser diode 108 usually consists of a DFB-LD (Distributed Feedback-Laser Diode). Thus, all the channel transmitters generate their respective light signals having different wavelengths.

All of the light signals generated by the channel transmitters 100 are inputted together into the WDM device 102, which multiplexes the light signals. The multiplexed light signals are transmitted through an optical transmission path 120, which may include a power amplifier, a linear amplifier, a preamplifier, etc. A Fabry-Perot filter 104, a photodetector 106, the oscillator 112, the PSD 114, the LPF 116 and the adder 118 serve to stabilize the wavelengths. The frequency of the light signal varies in the range of a few KHz around the resonant frequency of the Fabry-Perot filter 104, and is detected by the phase sensitive detector 114 to stabilize the wavelength. The Fabry-Perot filter 104 and photodetector 106 are commonly used for all the channels while the oscillator 112, the PSD 114, the LPF 116 and the adder 118 are provided for every channel transmitter 100. Hence, the output of the photodetector 106 is commonly supplied to all the channels.

The Fabry-Perot filter 104 has resonant frequencies continuously arranged with given free spectral ranges according to the central frequencies specified for the channels. The Fabry-Perot filter 104 is connected to the output of the WDM device 102. The light signal transmitted from the WDM device 102 through a light transmission path 120 is partly branched to the Fabry-Perot filter 104. To this end, a light signal branching device (not shown) is provided between the output of the WDM device 102 and the input of the Fabry-Perot filter 104. The photodetector 106 converts the light signals from the Fabry-Perot filter 104 into respective electrical signals supplied to the PSD's 114 of the channel transmitters 100. An example of the Fabry-Perot filter 104 is an Etalon filter.

The oscillator 112 of each channel transmitter 100 generates a particular dither signal supplied to the PSD 114 and adder 118. The dither signal is a sine wave used to modify the specified central frequency of each channel transmitter so as to vary the frequency of the light signal in the range of a few KHz around the resonant frequency to obtain an error signal for stabilizing the wavelength. The PSD 114 effects a phase sensitive detection of the dither signal and the output signal of the photodetector 106 so as to obtain an error signal corresponding to the first derivative signal of an Airy function, which represents the transmission characteristic curve of the Fabry-Perot filter 104. The LPF 116 filters the error signal to generate a direct current voltage of a level that represents the deviation of the wavelength of the light signal, generated by the laser diode 108, from the specified central frequency. If the wavelength of the light signal generated by the laser diode 108 is equal to the specified central frequency, the detected voltage is 0V. The detected voltage is supplied to the adder 118, combined with the dither signal from the oscillator 112 to form a bias signal of the laser diode driver 110. Accordingly, the wavelength of the light signal of the laser diode 108 is stabilized within a desired range.

The detected voltage of the LPF 116 may be divided into three parts according to the variation of the wavelength of the light signal of the laser diode 108. Firstly, if the wavelength precisely agrees with the specified central frequency, the detected voltage is 0V. Secondly, if it slightly deviates from the specified central frequency, the detected voltage has a level representing the deviation. However, thirdly, if it greatly deviates from the specified central frequency only to be out of the transmission characteristic curve of the Fabry-Perot filter 104, the detected value is 0V. Thus, the detected voltage is 0V not only when the wavelength of the light signal precisely agrees with the specified central frequency, but when it exceeds the transmission characteristic curve of the Fabry-Perot filter 104, greatly deviating from the stabilized range. Therefore, it is impossible to correctly determine the stabilization of the wavelength only with the error signal. Namely, if the wavelength of a channel greatly deviates from the stabilized range, it cannot be detected at the transmission side, but at the receiving side only after receiving the signal. This delays the correction of such an error.

Figure 2:
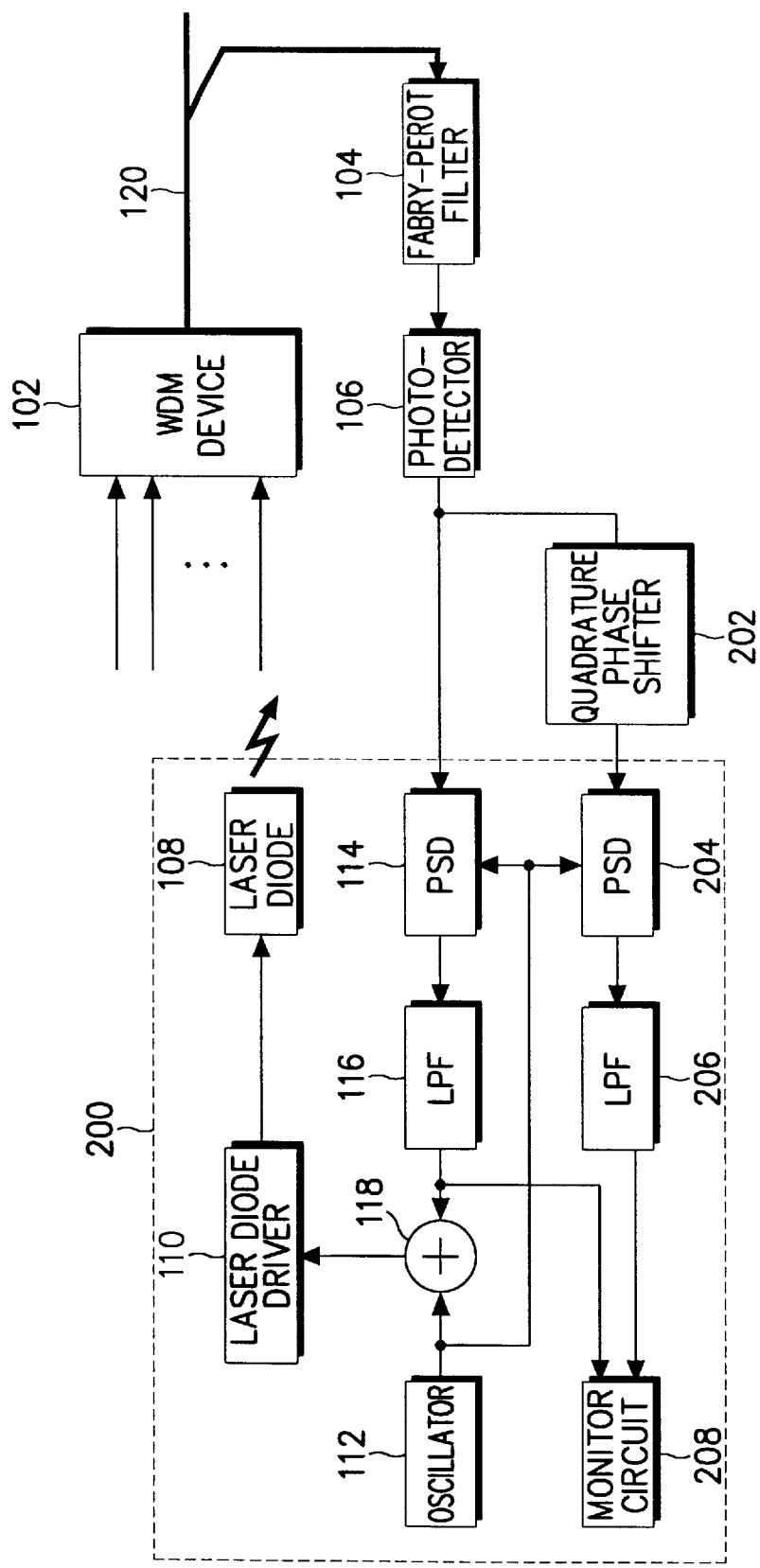
FIG. 2 is a block diagram illustrating a wavelength stabilizing circuit employing the Fabry-Perot filter in a WDM optical communications system according to an embodiment of the present invention.

Referring to FIG. 2, the inventive wavelength stabilizing circuit is characterized by a circuit for monitoring the state of the wavelength of a light signal that is added to each channel transmitter 100 of FIG. 1. Namely, it consists of a quadrature phase shifter 202, an additional PSD 204, an additional LPF 206 and a monitor circuit 208. The remaining parts of the optical communications system are the same as in FIG. 1. They are represented by the same reference numerals, and their description omitted for convenience's sake.

The quadrature phase shifter 202 shifts the output signal of the photodetector 106 by 90° to commonly provide for each of the channel transmitters 200. Thus, the output signal of the photodetector 106 is directly supplied in phase to the PSD 114 of each channel transmitter 200 while transferred in quadrature phase through the quadrature phase shifter 202 to the second PSD 204. Then, the LPP 116 filters the output signal of the first PSD 114 to generate a direct current voltage of a level representing the deviation of the wavelength of the light signal from the specified central frequency. The detected voltage is supplied to both the adder 118 and monitor circuit 208. Meanwhile, the second PSD 204 effects the phase sensitive detection of the dither signal of the oscillator 112 and the output signal of the quadrature phase shifter 202. Because the output signal of the photodetector 106 is shifted 90° by the quadrature phase shifter 202, the second PSD 204 generates a signal representing the intensity of the light signal from the laser diode 108. The second LPF 206 filters the output signal of the second PSD 204 to generate a direct current voltage supplied to the monitor circuit 208. Hereinafter, the detected voltage of the first PSD 114 is referred to as the "first detected voltage", and that of the second PSD 204 as the "second detected voltage".

The monitor circuit 208 monitors the wavelength stability and intensity of the light signal based on the first and second detected voltages to confirm whether or not wavelength stabilization has been achieved. Namely, the monitor circuit 208 indicates that the wavelength is stabilized only when the first detected voltage is in a prescribed stable range and the second detected voltage is equal to or greater than a prescribed reference level. The prescribed stable range is specified for each channel. Because the error signal detected by the first PSD 114 is the first derivative signal of the transmission characteristic curve of the Fabry-Perot filter 104, the first detected voltage is positively or negatively deviated with reference to the specified central frequency if not equal to it. Hence, the stable range is set between a positive upper limit and negative lower limit. The prescribed reference level represents the normal intensity of the light signal. If the wavelength of the light signal is equal to a desired value, the intensity has a maximum value, but if it greatly exceeds the stable range so as to be out of the transmission characteristic curve of the Fabry-Perot filter 104, the intensity becomes very small. Thus, the prescribed reference level determines whether the wavelength greatly exceeds the stable range.

Figure 3:
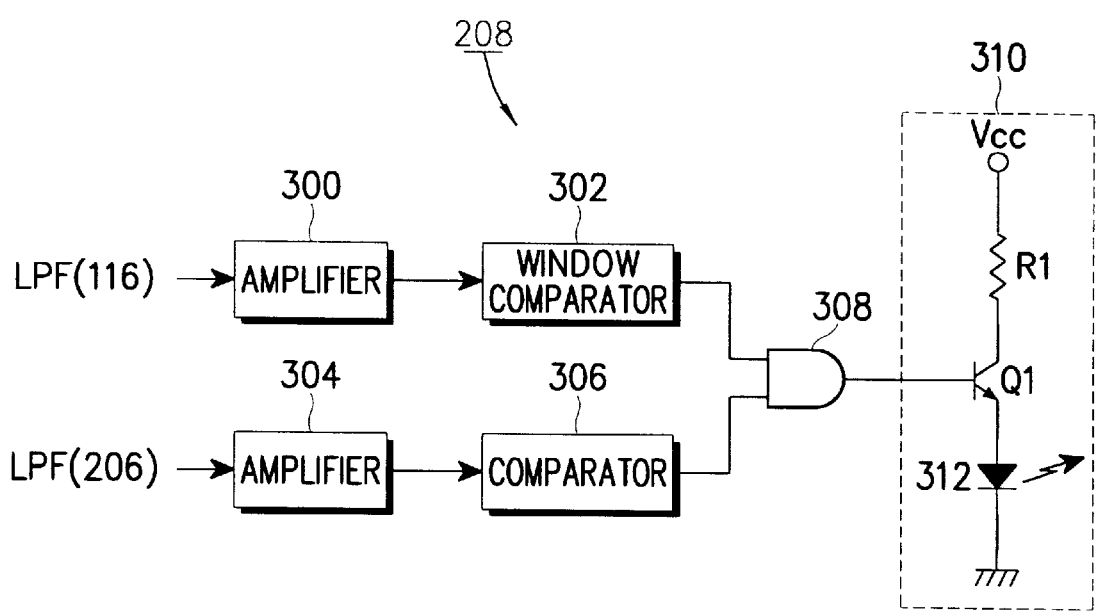
FIG. 3 is a detailed circuit diagram illustrating the monitor circuit as shown in FIG. 2.

As shown in FIG. 3, the monitor circuit 208 comprises: amplifiers 300 and 304, window comparator 302, another comparator 306, an AND gate 308, and a display 310. The first amplifier 300 amplifies the first detected voltage of the LPF 116 supplied to the window comparator 302, and the second amplifier 304 amplifies the second detected voltage of the second LPP 206 supplied to the comparator 306. The reference values of the window comparator 302 are the upper and lower limits of the stable range, and the reference value of the comparator 306 is the prescribed reference level. The window comparator 302 compares the first detected value with the upper and lower limits of the stable range to generate a logically high or low signal according to whether or not it is in the stable range. The other comparator 306 compares the second detected value with the reference level to generate a logically low or high signal according to whether or not it is lower than the reference level. The outputs of the two comparators are logically multiplied by the AND gate 308 to generate a control signal supplied to the display 310 consisting of an LED 312, an NPN transistor Q1 and resistor R1. The output of the AND gate 308 is connected to the base of the transistor Q1 whose collector is connected through the resistor R1 a the source voltage Vcc. The LED 312 is connected between the emitter of transistor Q1 and ground. Hence, the transistor Q1 turns the LED 312 on or off according to whether the output of the AND gate 308 is logically high or low.

Consequently, if the wavelength of the light signal is equal to the specified central frequency, the second detected voltage representing the intensity has its maximum value to make the output of the comparator 306 logically high, and the second detected voltage representing the error signal is equal to 0V to make the output of the window comparator 302 logically high, so that the LED 312 is turned on indicating that the wavelength is stabilized. On the contrary, if the wavelength greatly exceeds the stable range, the first detected voltage is equal to 0V, but the second detected voltage is lower than the reference level of the comparator 306 owing to the intensity being considerably reduced, so that the LED 312 is turned off indicating that the wavelength is not stabilized. Thus, the invention provides the wavelength stabilizing circuit with means for monitoring the wavelength stability and intensity of the light signal by observing both in-phase and quadrature-phase states of the light signal to indicate whether the wavelength is stabilized.

Figure 4:
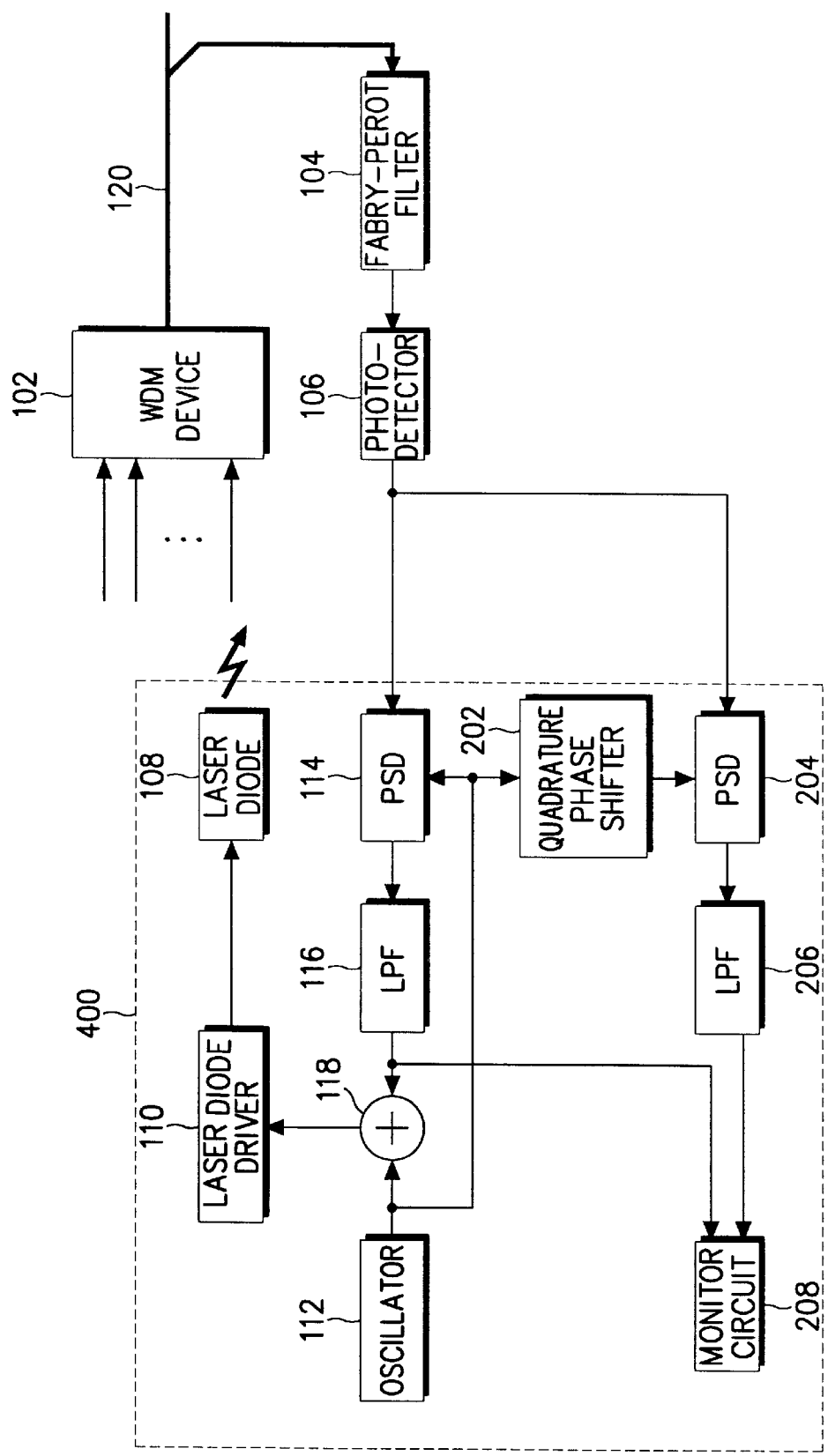
FIG. 4 is a block diagram illustrating a wavelength stabilizing circuit employing the Fabry-Perot filter in a WDM optical communications system according to another embodiment of the present invention.

In another embodiment as shown in FIG. 4, the phase of the dither signal of the oscillator 112 is shifted by 90° instead of that of the output signal of the photodetector 106, considering the weakness of the output signal of the photodetector 106 that is obtained by partly branching the output signal of the WDM device 102. Namely, while the output signal of the photodetector 106 is directly supplied to the PSD's 114 and 204, the quadrature phase shifter 202 is connected between the output of the oscillator 112 and the input of the second PSD 204. Thus, the PSD 204 is supplied with the output signal of the photodetector 106 and the dither signal of the oscillator 112 shifted by 90°, generating substantially the same signal as in FIG. 2, since the dither signal of the oscillator 112 is supplied to the first PSD 114 in phase with the output signal of the photodetector 106 while to the second PSD 204 in quadrature phase.

Thus, the inventive circuit makes it possible to quickly act upon the occurrence of an instability of the wavelength without any additional measuring instrument. While the present invention has been described with specific embodiments accompanied by the attached drawings, it will be appreciated by those skilled in the art that various changes and modifications may be made thereto without departing from the gist of the present invention. Particularly, instead of the LED of the monitor circuit 208 as shown in FIG. 3, another display device such as an LCD may be used to display the state of the wavelength in characters or graphics. In addition, the amplifiers 300 and 304 of the monitor circuit 208 may be eliminated provided that the first and second detected voltages have sufficient levels. Further, the oscillator 112, PSD 114 and 204, LPF 116 and 206, adder 118, and quadrature phase shifter 202 may be achieved by a DSP (Digital Signal Processor).

What is claimed is:

1. A circuit for monitoring the stability of wavelengths of light signals in an optical communications system employing wavelength division multiplexing (WDM) and having a wavelength stabilization circuit, comprising:
    a plurality of channel transmitters each having a laser diode for generating a light signal at a particular frequency under the control of a laser diode driver;
    a WDM device for multiplexing said wavelengths by wavelength division;
    a Fabry-Perot filter having resonant frequencies continuously arranged with given free spectral ranges according to specified central frequencies for the channels to resonate an output of said WDM device;
    a photodetector for converting output light signals of said Fabry-Perot filter into corresponding electrical signals; and
    a quadrature phase shifter for shifting a phase of an output signal of said photodetector by 90°;
    each of said channel transmitters further comprising:
        an oscillator for generating a dither signal of a frequency specified for a particular channel;
        a first phase sensitive detector (PSD) for effecting a phase sensitive detection of said dither signal and an output signal of said photodetector to generate an error signal corresponding to a first derivative signal of an Airy function;
        a first low pass filter (LPF) for filtering said error signal to generate a first detected direct current voltage having a level representing a deviation of the output signal of said photodetector from said central frequency;
        an adder for adding said dither signal and the first detected voltage to generate a bias signal supplied to said laser diode driver;
        a second PSD for effecting a phase sensitive detection of said dither signal and an output of said quadrature phase shifter to generate an intensity signal representing an intensity of a light signal transmitted by said WDM device;
        a second LPF for filtering said intensity signal to generate a second detected direct current voltage; and
        the monitor circuit monitoring said first and second detected voltages so as to indicate whether or not said wavelength of the light signal is stabilized based on said first and second detected voltages.

2. A circuit as defined in claim 1, said monitor circuit indicating a stabilized wavelength provided that said first detected voltage is in a prescribed stable range and said second detected voltage level is equal to or greater than a prescribed level.

3. A circuit as defined in claim 2, said monitor circuit further comprising:
    a window comparator for comparing said first detected voltage with upper and lower values of said prescribed stable range to generate a logically high or low signal according to whether or not said first detected voltage is in said stable range;
    another comparator for comparing said second detected voltage with said prescribed level to generate a logically low or high signal according to whether or not said second detected voltage is lower than said prescribed level;
    an AND gate for logically multiplying output signals of said window comparator and said another comparator; and
    a display for lighting an LED (light emitting diode) when an output of said AND gate is logically high.

4. A circuit as defined in claim 3, said LED being lighted to represent that said wavelength of the light signal is stabilized.

5. A circuit for monitoring the stability of wavelengths of light signals in an optical communications system employing WDM and having a wavelength stabilization circuit, comprising:
    a plurality of channel transmitters each having a laser diode for generating a light signal at a particular frequency under the control of a laser diode driver;
    a WDM device for multiplexing said wavelengths by wavelength division;
    a Fabry-Perot filter having resonant frequencies continuously arranged with given free spectral ranges according to specified central frequencies for the channels to resonate an output of said WDM device; and
    a photodetector for converting output light signals of said Fabry-Perot filter into corresponding electrical signals;

wherein each of said channel transmitters further comprising:
an oscillator for generating a dither signal of a frequency specified for a particular channel;
a first phase sensitive detector (PSD) for effecting a phase sensitive detection of said dither signal and an output signal of said photodetector to generate an error signal corresponding to a first derivative signal of an Airy function;
a first low pass filter (LPF) for filtering said error signal to generate a first detected direct current voltage having a level representing a deviation of the output signal of said photodetector from said central frequency;
an adder for adding said dither signal and the first detected voltage to generate a bias signal supplied to said laser diode driver;
a quadrature phase shifter for shifting a phase of the output signal of said photodetector by 90°;
a second PSD for effecting a phase sensitive detection of said dither signal and an output of said quadrature phase shifter to generate an intensity signal representing an intensity of a light signal transmitted by said WDM device;
a second LPF for filtering said intensity signal to generate a second detected direct current voltage; and
the monitor circuit monitoring said first and second detected voltages so as to indicate whether or not said wavelength of the light signal is stabilized.

6. A circuit as defined in claim 5, said monitor circuit indicating a stabilized wavelength provided that said first detected voltage level is in a prescribed table range and said second detected voltage level is equal to or greater than a prescribed level.

7. A circuit as defined in claim 6, said monitor circuit further comprising:
a window comparator for comparing said first detected voltage with upper and lower values of said prescribed stable range to generate a logically high or low signal according to whether or not said first detected voltage is in said stable range;
another comparator for comparing said second detected voltage with said prescribed level to generate a logically low or high signal according to whether or not said second detected voltage is lower than said prescribed level;
an AND gate for logically multiplying output signals of said window comparator and said another comparator; and
a display for lighting an LED (light emitting diode) when an output of said AND gate is logically high.

8. A circuit as defined in claim 7, said LED being lighted to represent that said wavelength of the light signal is stabilized.

9. A circuit for monitoring the stability of wavelength of light signals in an optical communications system employing WDM and having a wavelength stabilization circuit, comprising:
a plurality of channel transmitters each having a laser diode for generating a light signal at a particular frequency under the control of a laser diode driver;
a WDM device for multiplexing said wavelengths by wavelength division;
a Fabry-Perot filter having resonant frequencies continuously arranged with given free spectral ranges according to specified central frequencies for the channels to resonate an output of said WDM device; and
a photodetector for converting output light signals of said Fabry-Perot filter into corresponding electrical signals;
each of said channel transmitters further comprising:
an oscillator for generating a dither signal of a frequency specified for a particular channel;
a first phase sensitive detector (PSD) for effecting a phase sensitive detection of said dither signal and an output signal of said photodetector to generate an error signal corresponding to a first derivative signal of an Airy function;
a first low pass filter (LPF) for filtering said error signal to generate a first detected direct current voltage having a level representing a deviation of the output signal of said photodetector from said central frequency;
an adder for adding said dither signal and the first detected voltage to generate a bias signal supplied to said laser diode driver;
a quadrature phase shifter for shifting a phase of said dither signal by 90°;
a second PSD for effecting a phase sensitive detection of the output signal of said photodetector and an output signal of said quadrature phase shifter to generate an intensity signal representing an intensity of a light signal transmitted by said WDM device;
a second LPF for filtering said intensity signal to generate a second detected direct current voltage; and
the monitor circuit monitoring said first and second detected voltages so as to indicate to whether or not said wavelength of the light signal is stabilized based on said first and second detected voltages.

10. A circuit as defined in claim 9, said monitor circuit indicating a stabilized wavelength provided that said first detected voltage is in a prescribed stable range and said second detected voltage level is equal to or greater than a prescribed level.

11. A circuit as defined in claim 10, said monitor circuit rather comprising:
a window comparator for comparing said first detected voltage with upper and lower values of said prescribed stable range to generate a logically high or low signal according to whether or not said first detected voltage is in said stable range;
another comparator for comparing said second detected voltage with said prescribed level to generate a logically low or high signal according to whether or not said second detected voltage is lower than said prescribed level;
an AND gate for logically multiplying output signals of said window comparator and said another comparator; and
a display for lighting an LED (light emitting diode) when an output of said AND gate is logically high.

12. A circuit as defined in claim 11, said LED being lighted to represent that said wavelength of the light signal is stabilized.

* * * * *